United States Patent
Gambach et al.

(10) Patent No.: US 11,095,231 B2
(45) Date of Patent: Aug. 17, 2021

(54) MULTILEVEL POWER CONVERTER

(71) Applicant: SIEMENS AKTIENGESELLSCHAFT, Munich (DE)

(72) Inventors: Herbert Gambach, Uttenreuth (DE); Volker Hussennether, Nuremberg (DE); Roland Schuster, Erlangen (DE); Thomas Westerweller, Stegaurach (DE); Adnan Chaudhry, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/627,887

(22) PCT Filed: Jul. 5, 2017

(86) PCT No.: PCT/EP2017/066805
§ 371 (c)(1),
(2) Date: Dec. 31, 2019

(87) PCT Pub. No.: WO2019/007502
PCT Pub. Date: Jan. 10, 2019

(65) Prior Publication Data
US 2020/0161987 A1    May 21, 2020

(51) Int. Cl.
*H02M 7/483* (2007.01)
*H02M 1/32* (2007.01)

(52) U.S. Cl.
CPC ............ *H02M 7/483* (2013.01); *H02M 1/32* (2013.01); *H02M 2007/4835* (2013.01)

(58) Field of Classification Search
CPC .................... H02M 7/483; H02M 2007/4835
See application file for complete search history.

(56) References Cited

U.S. PATENT DOCUMENTS 4,888,676 A * 12/1989 Zurcher .............. H02M 7/5155
                                                    363/58
10,063,134 B2    8/2018 Subramanian
(Continued)

FOREIGN PATENT DOCUMENTS

WO    2016177398 A1    11/2016
WO    2017029327 A1    2/2017

OTHER PUBLICATIONS

Du Sixing et al: "An Active Cross-Connected Modular Multilevel Converter (AC-MMC) for a Medium-Voltage Motor Drive", IEEE Transactions on Industrial Electronics, IEEE Service Center, Piscataway, NJ, USA, vol. 63, No. 8, pp. 4707-4717 XP011616265, ISSN:0278-0046, DOI: 10.1109/T18.2016.2547875, Figure 1-2; 2016 Abbildung 1.

(Continued)

*Primary Examiner* — Peter M Novak
(74) *Attorney, Agent, or Firm* — Laurence Greenberg; Werner Stemer; Ralph Locher

(57) ABSTRACT

A multilevel power converter has at least one phase module with a plurality of modules connected between positive and negative DC voltage connections. The phase module has a first phase module branch connected to the positive DC voltage connection, and a second phase module branch connected to the negative DC voltage connection. Each of the modules has at least two electronic switching elements and an electric energy storage unit. A third phase module branch connects the first phase module branch to the second phase module branch. A switching device connects an AC voltage connection of the multilevel power converter to a first connection node between the first phase module branch and the third phase module branch in a first switch position and connects the AC voltage connection to a second con- (Continued)

nection node between the third phase module branch and the second phase module branch in a second switch position.

17 Claims, 10 Drawing Sheets

(56) References Cited

U.S. PATENT DOCUMENTS

| | | | |
|---|---|---|---|
| 2013/0308235 A1 | 11/2013 | Davies et al. | |
| 2014/0293668 A1* | 10/2014 | Trainer | H02M 7/5388 363/71 |
| 2015/0155770 A1* | 6/2015 | Ying | H02M 7/487 307/52 |
| 2017/0077834 A1 | 3/2017 | Trainer et al. | |
| 2018/0241321 A1* | 8/2018 | Whitehouse | H02J 3/36 |

OTHER PUBLICATIONS

Nami Alireza et al, "Modular Multilevel Converters for HVDC Applications: Review on Converter Cells and Functionalities", Jan. 1, 2015 (Jan. 1, 2015), Band 30, No. 1, Seite 18-36, XP011557523 DOI: 10.1109/TPEL.2014.2327641, ISSN:0885-8993, [gefunden am Aug. 26, 2014], Abbildungen 8a-8e.

* cited by examiner $U_{ac} > 0 \ (0 \ldots T/2) : 424 \text{ in, } 428 \text{ out}$ $U_{ac} < 0 \ (T/2 \ldots T) : 424 \text{ out, } 428 \text{ in}$

MULTILEVEL POWER CONVERTER

BACKGROUND OF THE INVENTION

Field of the Invention

The invention relates to a multilevel power converter having at least one phase module, that is arranged between a first DC voltage terminal and a second DC voltage terminal of the multilevel power converter. The phase module comprises a plurality of modules. The phase module comprises a first phase module branch, which is connected to the first DC voltage terminal, and a second phase module branch, which is connected to the second DC voltage terminal. The modules respectively comprise at least two electronic switching elements and an electrical energy store. The invention further relates to a method for operating a multilevel power converter.

A multilevel power converter (also described as a modular multilevel power converter) is a power electronics circuit arrangement for the conversion of electrical energy. Using a multilevel power converter, for example, alternating current can be rectified into direct current, or direct current can be inverted into alternating current. A multilevel power converter comprises a plurality of identical modules, which are electrically connected in series. The electrical series connection of modules permits the achievement of high output voltages. A multilevel power converter can be simply adapted (scaled) to different voltages, and a desired output voltage can be achieved with a relatively high degree of accuracy. A multilevel power converter can be advantageously employed in the high-voltage range, for example as a power converter in a high-voltage direct current transmission installation, or as a reactive power compensation installation.

The number of modules in the series-connected electrical arrangement is selected such that the multilevel power converter can generate the requisite output voltage. Moreover, the number of modules in the series-connected arrangement must be also be sufficiently large such that, in all operating states of the multilevel power converter, the voltage present on the modules does not exceed the maximum permissible module voltage. Consequently, more modules must be present in the series-connected arrangement than would be necessary for the generation of a predefined output voltage. This results in high costs, high power losses, and a multilevel power converter of a large structural design.

SUMMARY OF THE INVENTION

The object of the invention is therefore the disclosure of a multilevel power converter and a method, wherein the number of modules can be reduced.

According to the invention, this object is fulfilled by a multilevel power converter and by a method as claimed in the independent patent claims. Advantageous forms of embodiment of the multilevel power converter and the method are disclosed in the dependent patent claims.

A multilevel power converter is disclosed, having at least one phase module, which is arranged between a first DC voltage terminal and a second DC voltage terminal of the multilevel power converter, and which comprises a plurality of modules, wherein the phase module comprises a first phase module branch, which is connected to the first DC voltage terminal, and a second phase module branch, which is connected to the second DC voltage terminal, and wherein the modules respectively comprise at least two electronic switching elements and an electrical energy store. The multilevel power converter comprises a third phase module branch, which connects the first phase module branch to the second phase module branch, and a switching device which, in a first switch position, (electrically) connects an AC voltage terminal of the multilevel power converter to a first connection point between the first phase module branch and the third phase module branch and, in a second switch position, (electrically) connects the AC voltage terminal to a second connection point between the third phase module branch and the second phase module branch. In other words, the switching device is designed, in a first switch position, to (electrically) connect an AC voltage terminal of the multilevel power converter to a first connection point between the first phase module branch and the third phase module branch and, in a second switch position, to (electrically) connect the AC voltage terminal to a second connection point between the third phase module branch and the second phase module branch. The first connection point is the (common) connection point of the first phase module branch and the third phase module branch. The first connection point is therefore the point at which the first phase module branch is electrically connected to the third phase module branch. The second connection point is the (common) connection point of the third phase module branch and the second phase module branch. The second connection point is therefore the point at which the third phase module branch is electrically connected to the second phase module branch.

It is particularly advantageous if the switching device electrically connects the AC voltage terminal of the multilevel power converter, either to the first connection point or to the second connection point. Accordingly, the number of modules between the AC voltage terminal and the first DC voltage terminal can be increased or reduced, as required, by the number of modules on the third phase module branch. Likewise, the number of modules between the AC voltage terminal and the second DC voltage terminal can be increased or reduced by the number of modules on the third phase module branch. In other words, the modules on the third phase module branch can therefore be assigned to the first phase module branch or the second phase module branch, as required. These modules on the third phase module branch therefore assume a dual function. Depending upon the switch position of the switching device, these modules are switched-in between the AC voltage terminal of the multilevel power converter and the first DC voltage terminal, or between the AC voltage terminal and the second DC voltage terminal. The modules on the third phase module branch are therefore employed for the generation of various voltages on the multilevel power converter. By the provision of an option for the switchover between the first switch position and the second switch position, it is only necessary to provide one set of modules on the third phase module branch. (In previously known multilevel power converters, it has been necessary for these modules to be provided in duplicate, namely, one set in the first (positive-side) phase module branch, and one set in the second (negative-side) phase module branch). As a result, the number of modules required per phase module can be significantly reduced. This also results in a significant reduction in the size of the multilevel power converter, in power converter losses and in costs. It is possible to achieve a 25% economy in the number of modules required. Moreover, by means of the switching device, rapid fault detection can be achieved. Although the term "switching device" is employed, this does not necessarily mean that the switching device has to be a mechanical switching device. Instead, it is advantageously provided that the switching device can be a power electronics switching device—see below.

The multilevel power converter can be configured such that the switching device, in the second switch position, (electrically) isolates the AC voltage terminal of the multilevel power converter from the first connection point and, in the first switch position, (electrically) isolates the AC voltage terminal from the second connection point. In general, the switching device, in each switch position respectively, connects the AC voltage terminal to a maximum of only one connection point (associated with the switch position) (and isolates the AC voltage terminal from the other respective connection points). The switching device (in its switch positions) therefore connects the AC voltage terminal exclusively with one connection point (associated with the switch position) in each case. Naturally, a switch position can also be provided in which the AC voltage terminal is isolated from all the connection points.

The multilevel power converter can also be configured such that the first phase module branch, the second phase module branch and the third phase module branch comprise at least two of the modules respectively, and specifically at least five of the modules respectively, in a series-connected arrangement.

The multilevel power converter can also be configured such that the switching device comprises thyristors (by way of switching devices). By means of thyristors, the switchover between the first connection point and the second connection point can be executed in a particularly rapid manner.

The multilevel power converter can also be configured such that
the switching device comprises a first power electronics switch which, in the first switch position of the switching device, (electrically) connects the AC voltage terminal to the first connection point and, in the second switch position of the switching device, (electrically) isolates the AC voltage terminal from the first connection point, and
the switching device comprises a second power electronics switch which, in the second switch position of the switching device, (electrically) connects the AC voltage terminal to the second connection point and, in the first switch position of the switching device, (electrically) isolates the AC voltage terminal from the second connection point. By means of the two power electronics switches of the switching device, the switchover between the first connection point and the second connection point can be executed in a particularly simple and rapid manner.

The multilevel power converter can be configured such that the first power electronics switch and the second power electronics switch respectively comprise thyristors.

The multilevel power converter can also be configured such that first power electronics switch and the second power electronics switch respectively comprise antiparallel-connected thyristors. By this arrangement, the power electronics switches can switch the alternating current flowing in the AC voltage terminal in both polarities.

The multilevel power converter can be configured such that at least one module of the third phase module branch is configured to deliver a voltage output with a positive or a negative polarity. Specifically, this advantageously supports the switch-off process of the thyristors. It is particularly advantageous that the at least one module is capable of generating and delivering both a negative voltage and a positive voltage output. By means of this voltage, the commutation of the current flowing via the AC voltage terminal from the first connection point to the second connection point can be executed in a secure and reliable manner. This can be achieved, for example, wherein a voltage in opposition to the original current flux is generated by means of the module, by way of a commutation voltage.

The multilevel power converter can be configured such that at least one module of the third phase module branch comprises a full-bridge circuit. It is particularly advantageous that the at least one module, having a full-bridge circuit, is capable of generating and delivering both a negative voltage and a positive voltage output. This supports commutation, as indicated above.

The multilevel power converter can be configured such that the full-bridge circuit comprises four electronic switching elements and an electrical energy store.

The multilevel power converter can be configured such that the third phase module branch comprises a plurality of electrically series-connected sub-branches, and the switching device comprises a third switch position, wherein the AC voltage terminal is connected to a third connection point of two sub-branches (and wherein the AC voltage terminal is (electrically) isolated from the first connection point and the second connection point). This multilevel power converter comprises further connection points (potential points), to which the AC voltage terminal can be connected by means of the switching device.

The multilevel power converter can also be configured such that the switching device assumes the switch positions (specifically the first switch position and the second switch position) in accordance with the instantaneous value of the voltage (alternating voltage) which is present on the AC voltage terminal. Advantageously, the switching device can be actuated such that it assumes said switch positions in accordance with the instantaneous value of the voltage (alternating voltage) which is present on the AC voltage terminal. A particularly simple manner of actuating the switching device is provided accordingly.

It is only necessary for the instantaneous value of the alternating voltage to be evaluated and, in accordance with the magnitude of the instantaneous value, the switching device will assume the respective switch position (specifically the first switch position and the second switch position).

The multilevel power converter can also be configured such that
the switching device assumes the first switch position, if the instantaneous value of the voltage which is present on the AC voltage terminal is greater than (or equal to) zero, and the switching device assumes the second switch position, if the instantaneous value of the voltage which is present on the AC voltage terminal is lower than zero, or
the switching device assumes the first switch position, if the instantaneous value of the voltage which is present on the AC voltage terminal lies within a first preselected voltage range, and the switching device assumes the second switch position, if the instantaneous value of the voltage which is present on the AC voltage terminal lies within a second preselected voltage range. The first alternative advantageously constitutes a particularly simple option for determining when the switching device assumes the first switch position, and when it assumes the second switch position: if the instantaneous value of the alternating voltage is greater than (or equal to) zero, the first switch position is assumed; if the instantaneous value of the alternating voltage is lower than zero, the second switch position is assumed. According to the second alternative, it is provided that the first switch position is assumed if the instantaneous value of the alternating voltage lies within a first preselected voltage range. If the instantaneous value lies within a second preselected voltage range, the second switch position is assumed. This variant permits even greater flexibility in the switching of the switching device.

A high-voltage direct current transmission installation is further disclosed, having a power converter according to the above-mentioned variants.

A method is further disclosed for operating a multilevel power converter having at least one phase module, which is arranged between a first DC voltage terminal and a second DC voltage terminal of the multilevel power converter, and which comprises a plurality of modules, wherein the phase module comprises a first phase module branch, which is connected to the first DC voltage terminal, a second phase module branch, which is connected to the second DC voltage terminal, and a third phase module branch, which connects the first phase module branch to the second phase module branch,
wherein, according to the method
  an instantaneous value of the voltage which is present on an AC voltage terminal of the multilevel power converter is measured, and
  depending upon the measured instantaneous value, the AC voltage terminal is (electrically) connected to a first connection point between the first phase module branch and the third phase module branch, or to a second connection point between the third phase module branch and the second phase module branch.
The method can be executed such that
  the AC voltage terminal is (electrically) connected to is the first connection point or the second connection point by means of a switching device which comprises at least one power electronics switch.
The method can also be executed such that
in the first switch position of the switching device, the AC voltage terminal is (electrically) connected to the first connection point and the AC voltage terminal is (electrically) isolated from the second connection point, and
in the second switch position of the switching device, the AC voltage terminal is (electrically) connected to the second connection point and the AC voltage terminal is (electrically) isolated from the first connection point.
The method can be executed such that
the AC voltage terminal is (electrically) connected to the first connection point, if the instantaneous value of the voltage which is present on the AC voltage terminal is greater than (or equal to) zero, and the AC voltage terminal is (electrically) connected to the second connection point, if the instantaneous value of the voltage which is present on the AC voltage terminal is lower than zero, or
the AC voltage terminal is (electrically) connected to the first connection point, if the instantaneous value of the voltage which is present on the AC voltage terminal lies within a first preselected voltage range, and the AC voltage terminal is (electrically) connected to the second connection point, if the instantaneous value of the voltage which is present on the AC voltage terminal lies within a second preselected voltage range.
The method can also be executed such that the third phase module branch comprises a plurality of electrically series-connected sub-branches, between which at least one further connection point is provided, and wherein, depending upon the measured instantaneous value (of the voltage which is present on the AC voltage terminal of the multilevel power converter), the AC voltage terminal is (electrically) connected to the first connection point, to the second connection point, or to the further connection point.
The method can be executed such that
in the event of the occurrence of a fault, specifically the occurrence of a (DC voltage-side) short-circuit, the AC voltage terminal, by means of the switching device (in the fault-response switch position thereof) is electrically isolated from the phase module (specifically from the connection points of the phase module).

The above-mentioned multilevel power converter and the above-mentioned method provide identical or similar advantages.

The invention is described in greater detail hereinafter, with reference to exemplary embodiments. Identical reference numbers refer to identical or identically-functioning elements.

To this end:

DESCRIPTION OF THE INVENTION

Figure 1:
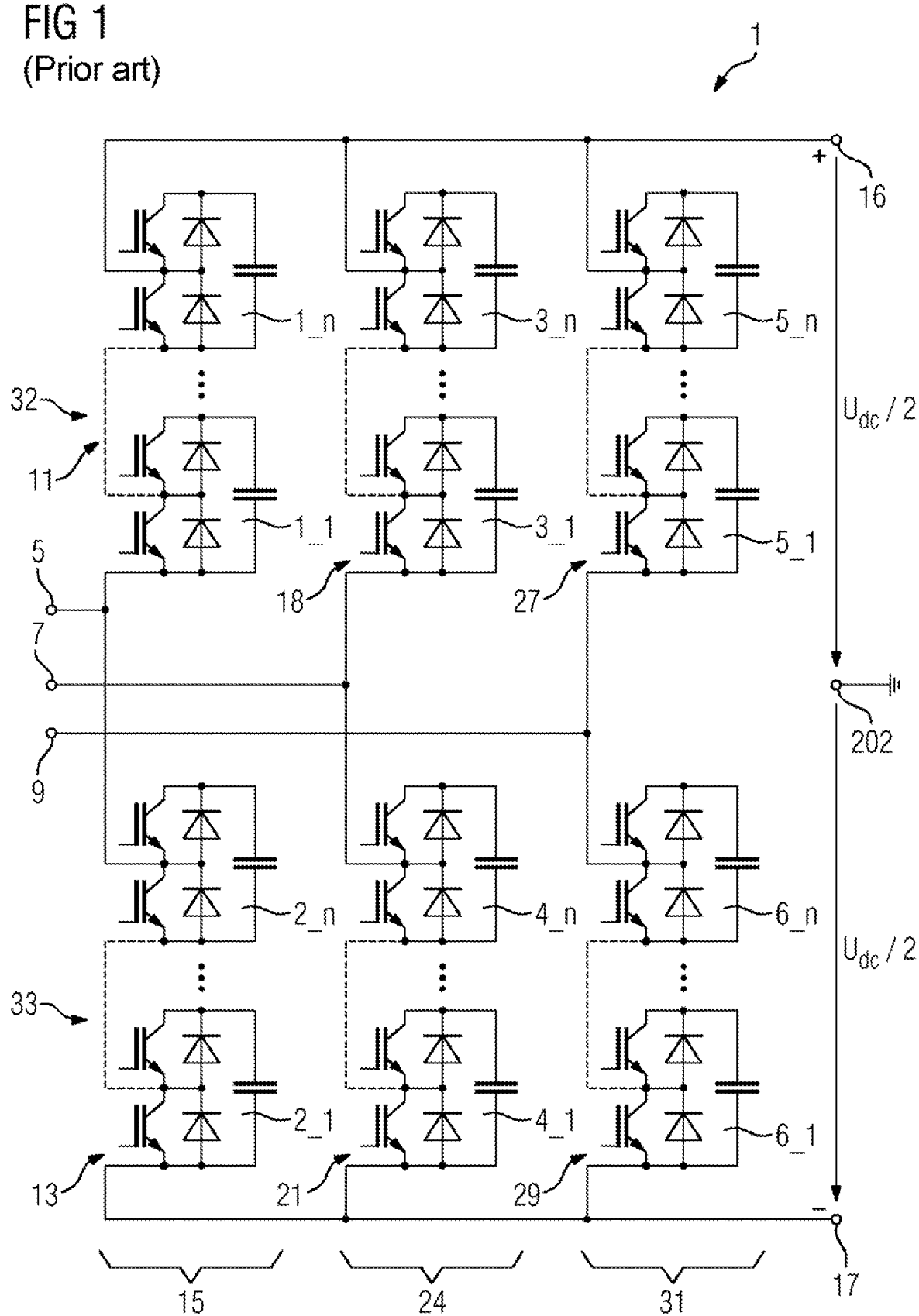
FIG. 1 represents an exemplary embodiment of a multilevel power converter which is known from the prior art.

FIG. 1 shows a multilevel power converter 1 (modular multilevel converter, or MMC) which is known from the prior art. This multilevel power converter 1 comprises a first AC voltage terminal 5, a second AC voltage terminal 7, and a third AC voltage terminal 9. The first AC voltage terminal 5 is electrically connected to a first phase module branch 11 and to a second phase module branch 13. The first phase module branch 11 and the second phase module branch 13 constitute a first phase module 15 of the power converter 1. The end of the first phase module branch 11 which is averted from the first AC voltage terminal 5 is electrically connected to the first DC voltage terminal 16; the end of the second phase module branch 13 which is averted from the first AC voltage terminal 5 is electrically connected to a second DC voltage terminal 17. The first DC voltage terminal 16 is a positive DC voltage terminal; the second DC voltage terminal 17 is a negative DC voltage terminal.

The second AC voltage terminal 7 is electrically connected to one end of a third phase module branch 18 and to one end of a fourth phase module branch 21. The third phase module branch 18 and the fourth phase module branch 21 constitute a second phase module 24. The third AC voltage terminal 9 is electrically connected to one end of a fifth phase module branch 27 and to one end of a sixth phase module branch 29. The fifth phase module branch 27 and the sixth phase module branch 29 constitute a third phase module 31.

The end of the third phase module branch 18 which is averted from the second AC voltage terminal 7 and the end of the fifth phase module branch 27 which is averted from the third AC voltage terminal 9 are electrically connected to the first DC voltage terminal 16. The end of the fourth phase module branch 21 which is averted from the second AC voltage terminal 7 and the end of the sixth phase module branch 29 which is averted from the third AC voltage terminal 9 are electrically connected to the second DC voltage terminal 17. The first phase module branch 11, the third phase module branch 18 and the fifth phase module branch 27 constitute a positive-side power converter section 32; the second phase module branch 13, the fourth phase module branch 21 and the sixth phase module branch 29 constitute a negative-side power converter section 33.

The first AC voltage terminal 5, the second AC voltage terminal 7 and the third AC voltage terminal 9 can be electrically connected to an AC electricity transmission system (not represented).

Each phase module branch comprises a plurality of modules (1_1 . . . 1_n; 2_1 . . . 2_n; etc.) which (by means of their galvanic power terminals) are electrically connected in series. Modules of this type are also described as submodules. In the exemplary embodiment according to FIG. 1, each phase module branch comprises n modules. The number of modules which are electrically connected in series by means of their galvanic power terminals can be highly variable—although at least two modules are connected in series, it is also possible for 5, 50, 100 or more modules to be electrically connected in series. In the exemplary embodiment, n=36: the first phase module branch 11 thus comprises 36 modules 1_1, 1_2, 1_3, . . . 1_36. The other phase module branches 13, 18, 21, 27 and 29 are of identical design.

From an unrepresented control device of the power converter 1, optical messages or optical signals are transmitted via an optical communication link (for example via an optical wave guide) to the individual modules 1_1 to 6_n. For example, the control device transmits a target value to each of the individual modules for the magnitude of the output voltage which is to be delivered by the respective module.

Figure 2:
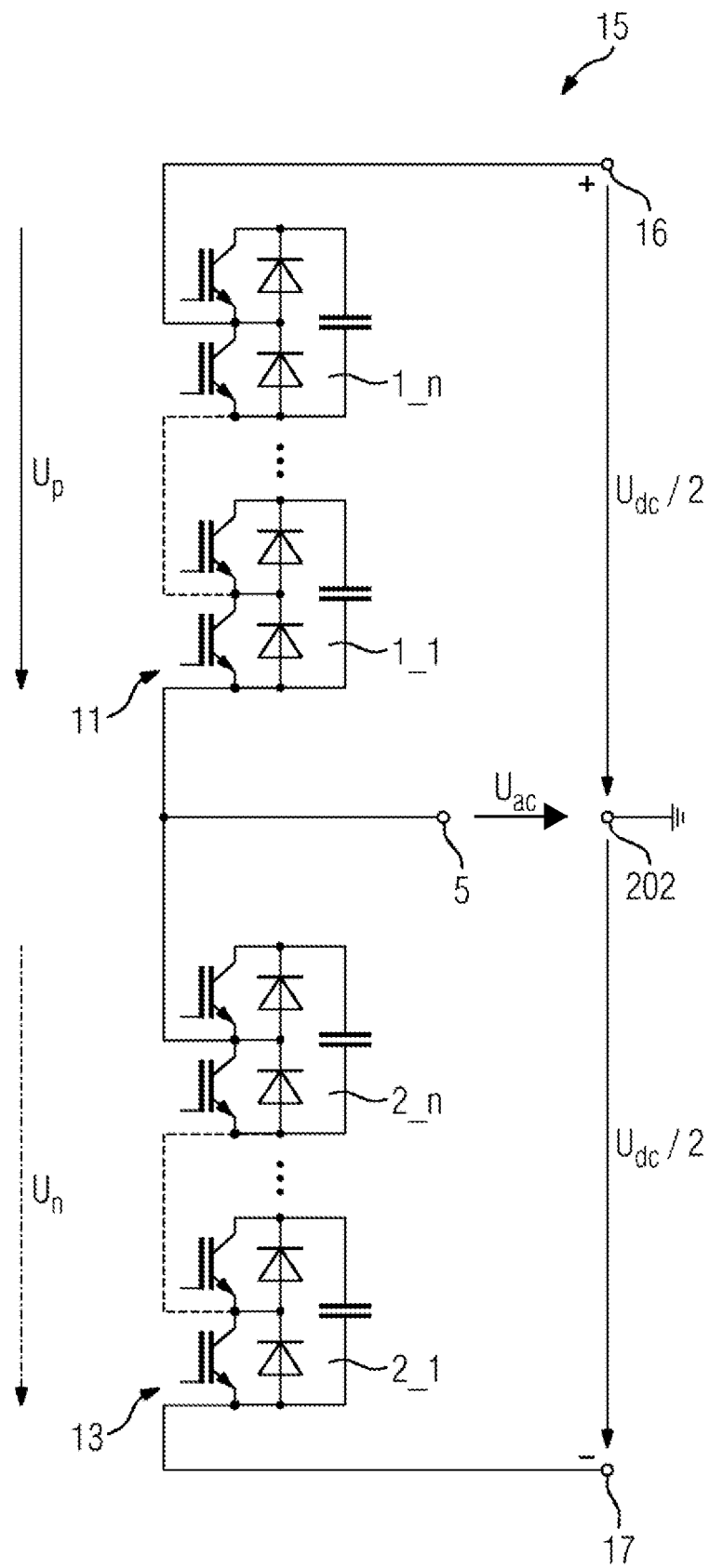
FIG. 2 represents a phase module of the known multilevel power converter.

FIG. 2 represents the first phase module 15 of the multilevel power converter 1. On this first phase module 15, various voltages are constituted. A first voltage $U_p$ is applied across the first phase module branch 11, and a second voltage $U_n$ is applied across the second phase module branch 13. Between the first AC voltage terminal 5 and a ground terminal 202, an alternating voltage $U_{ac}$ is applied. Between the first DC voltage terminal 16 and the ground terminal 202 the voltage $\frac{1}{2} U_{dc}$ is applied, wherein $U_{dc}$ is the total DC voltage which is present between the first DC voltage terminal 16 and the second DC voltage terminal 17. Between the ground terminal 202 and the second DC voltage terminal 17, the voltage $\frac{1}{2} U_{dc}$ is also applied.

Figure 3:
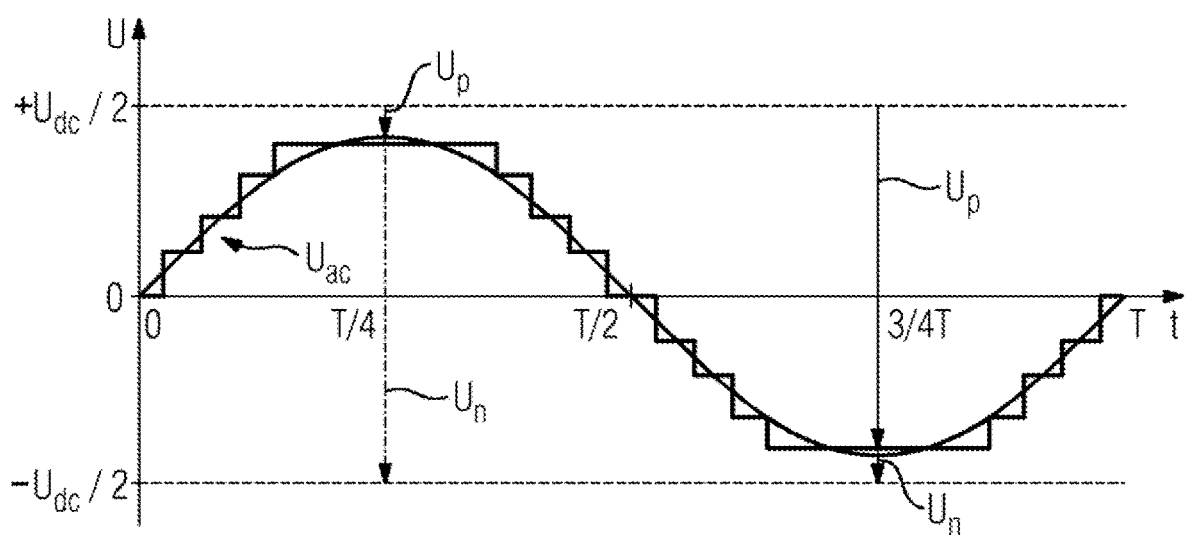
FIG. 3 represents an exemplary voltage characteristic of the phase module according to FIG. 2.

In FIG. 3, these voltages are shown in an exemplary graphic representation, plotted against time t. One cycle of the alternating voltage $U_{ac}$ is represented, which occurs on the first AC voltage terminal 5. At time point t=T/4 (which corresponds to one quarter of the cycle period of the AC voltage), the maximum positive value (the positive maximum instantaneous value) of the AC voltage $U_{ac}$ occurs, whereas at time point t=¾ T the maximum negative value of the AC voltage occurs. At time point t=T/4, virtually the entire DC voltage $U_{dc}$ is present in the form of the voltage $U_n$ on the second phase module branch 13. At time point t=¾ T, virtually the entire DC voltage $U_{dc}$ is present in the form of the voltage $U_p$ on the first phase module branch 11. This means that both the first phase module branch 11 and the second phase module branch 13 must be configured such that they are respectively capable of being energized with the full DC voltage $U_{dc}$. In other words, a correspondingly large number of modules 1_1 . . . 1_n, 2_1 . . . 2_n is required in the phase module branches 11, 13, as each module is only rated for a predefined maximum voltage loading.

Figure 4:
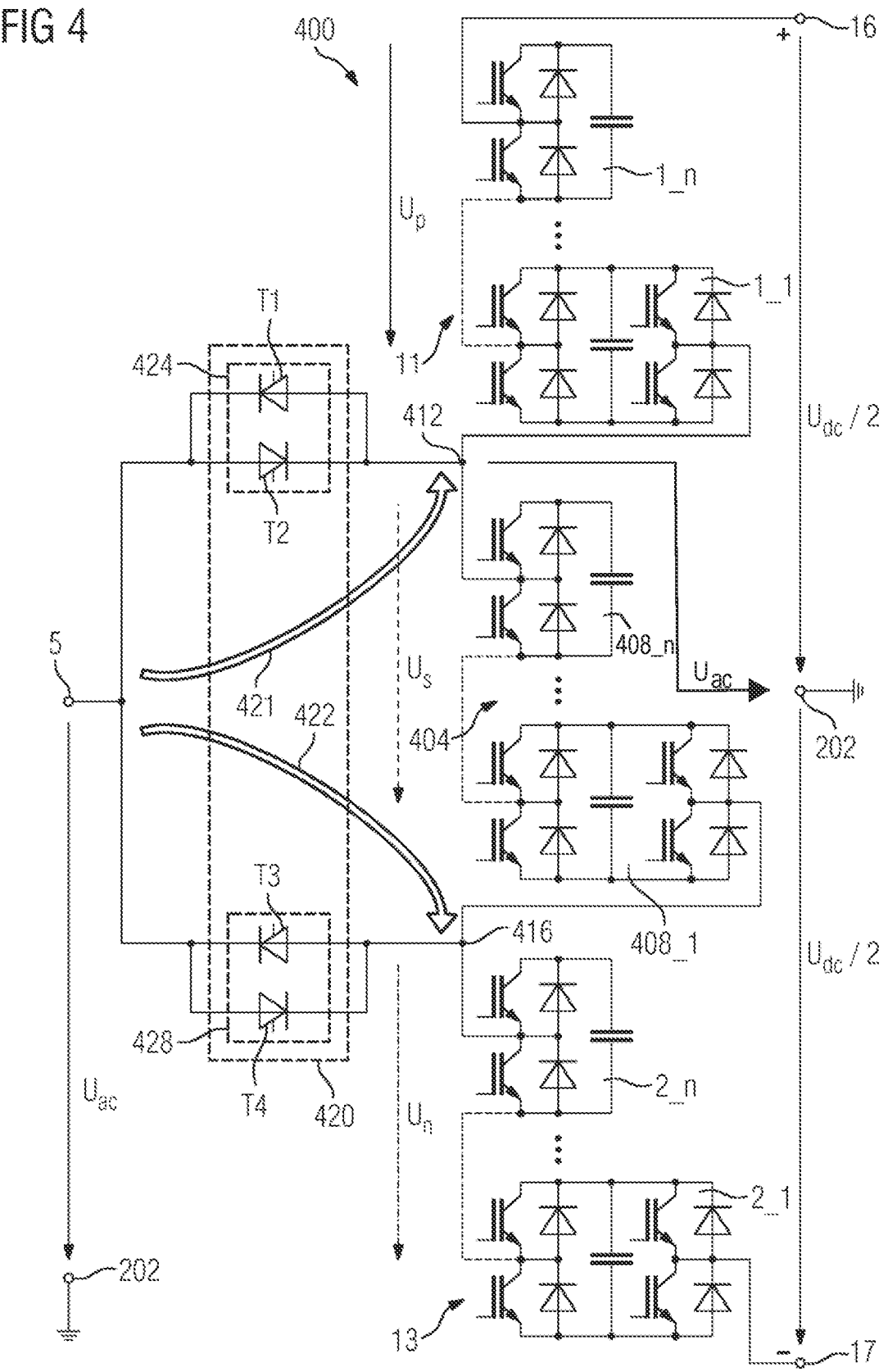
FIG. 4 represents an exemplary embodiment of a phase module of a multilevel power converter according to the invention.

FIG. 4 represents an exemplary embodiment of a phase module 400 according to the invention. This phase module 400, in addition to the first (positive-side) phase module branch 11 and the second (negative-side) phase module branch 13, comprises a third (central) phase module branch 404. On the third phase module branch 404, a third voltage $U_s$ occurs. The phase module 400 is arranged between the first DC voltage terminal 16 and the second DC voltage terminal 17, wherein the first phase module branch 11 is connected to the first DC voltage terminal 16. The second phase module branch 13 is connected to the second DC voltage terminal 17. Each phase module branch comprises a plurality of modules. In the exemplary embodiment, the first phase module branch 11 comprises n modules 1_1 . . . 1_n, each of which can be configured as a half-bridge circuit (half-bridge module) or as a full-bridge circuit (full-bridge module). For example, module 1_1 is constituted as a full-bridge module, and module 1_n as a half-bridge module. The second phase module branch 13 likewise comprises n modules 2_1 . . . 2_n, each of which can be configured as a half-bridge circuit (half-bridge module) or as a full-bridge circuit (full-bridge module). Accordingly, the first phase module branch 11 and the second phase module branch 13, for example, can respectively comprise half-bridge modules only (or, respectively, full-bridge modules only).

The third phase module branch 404 comprises at least one module 408_1 having a full-bridge circuit (a full-bridge module 408_1), together with further modules 408_2 to 408_n, each of which can be configured as a half-bridge circuit (half-bridge module) or as a full-bridge circuit (full-bridge module).

The third phase module branch 404 connects the first phase module branch 11 to the second phase module branch 13 by the constitution of a first connection point 412 between the first phase module branch 11 and the third phase module branch 404, and by the constitution of a second connection point 416 between the third phase module branch 404 and the second phase module branch 13. To this end, a switching device 420 is designed, in a first switch position 421, to electrically connect the first AC voltage terminal 5 to the first connection point 412 and, in a second switch position 422, to electrically connect the first AC voltage terminal 5 to the second connection point 416. The switching device 420 is further designed, in the second switch position 422, to electrically isolate the AC voltage terminal 5 from the first connection point 412 and, in the first switch position 421, to electrically isolate the first AC voltage terminal 5 from the second connection point 416.

The switching device 420 comprises, by way of switching elements, a first thyristor T1, a second thyristor T2, a third thyristor T3 and a fourth thyristor T4. More specifically, the switching device comprises a first power electronics switch 424 and a second power electronics switch 428. The first power electronics switch 424 comprises the first thyristor T1 and the second thyristor T2; the second power electronics switch 428 comprises the third thyristor T3 and the fourth thyristor T4. The first power electronics switch 424 thus comprises antiparallel-connected thyristors T1 and T2; the second power electronics switch 428 comprises antiparallel-connected thyristors T3 and T4.

The representation of individual thyristors T1, T2, T3 and T4 is to be understood as symbolic only. In practice, for example, a larger number of thyristors can be connected in series and/or in parallel, in order to permit the achievement of the requisite voltage and current values.

The first power electronics switch 424, in the first switch position of the switching device 420, electrically connects the first AC voltage terminal 5 to the first connection point 412; the first power electronics switch 424, in the second switch position of the switching device 420, electrically isolates the first AC voltage terminal 5 from the first connection point 412. The second power electronics switch 428, in the second switch position of the switching device 420, electrically connects the first AC voltage terminal 5 to the second connection point 416; the second power electronics switch 428, in the first switch position of the switching device 420, electrically isolates the first AC voltage terminal 5 from the second connection point 416.

The switching device 420 assumes its switch positions (i.e. the first switch position and the second switch position) in accordance with the instantaneous value of the AC voltage which is present on the AC voltage terminal 5. More specifically, the switching device 420 is actuated by an (unrepresented) actuating device, such that it assumes its switch positions (i.e. the first switch position and the second switch position) in accordance with the instantaneous value of the AC voltage which is present on the AC voltage terminal 5. The switching device 420 thus assumes the first switch position, if the instantaneous value of the AC voltage is greater than (or equal to) zero. The first AC voltage terminal 5 is then electrically connected to the first connection point 412. The switching device 420 assumes the second switch position, if the instantaneous value of the AC voltage which is present on the AC voltage terminal 5 is lower than zero. The first AC voltage terminal 5 is then electrically connected to the second connection point 416.

The multilevel power converter can also be designed such that the switching device assumes the first switch position, if the instantaneous value of the voltage which is present on the AC voltage terminal lies within a first preselected voltage range, and the switching device assumes the second switch position, if the instantaneous value of the voltage which is present on the AC voltage terminal lies within a second preselected voltage range. The first preselected voltage range can be, for example, the voltage range between 0 and $+\frac{1}{2} U_{dc}$; the second preselected voltage range can be, for example, the voltage range between $-\frac{1}{2} U_{dc}$ and 0.

Figure 5:
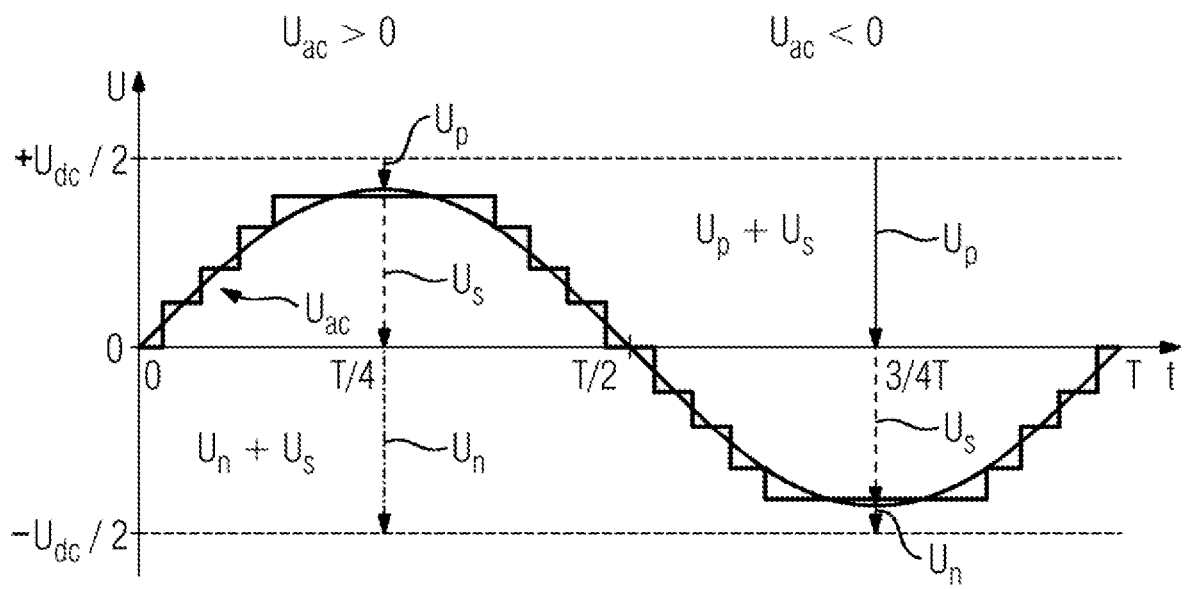
FIG. 5 represents an exemplary voltage characteristic of the phase module according to FIG. 4.

FIG. 5 represents an exemplary embodiment of the voltages occurring in the phase module 400. During the time interval between t=0 and t=½ T (i.e. during the time period in which the instantaneous values of the AC voltage $U_{ac}$ are greater than zero) only the relatively low voltage $U_p$ is present on the first phase module branch 11. The larger voltage ($U_{dc}-U_p$) is distributed on the second phase module branch 13 (in the form of the voltage $U_n$) and on the third phase module branch 404 (in the form of the voltage $U_s$). As a result, a maximum voltage ½ $U_{dc}$ is present on the first phase module branch 11, on the second phase module branch 13 and on the third phase module branch 404 respectively. Consequently, it is only necessary for each phase module branch 11, 13 and 404 to be rated for half the maximum DC voltage ½ $U_{dc}$ in each case. In comparison with the previously known phase module 15 according to FIG. 2, fewer modules are therefore required. A 25% economy in modules can be achieved, as the modules on the third phase module branch 404 are optionally assigned, so to speak, either to the first phase module branch 11 or the third phase module branch 404 (provided that equal numbers of modules are present in each phase module branch). During the second cycle period (i.e. in the region between t=½ T and t=T), only the relatively low voltage $U_n$ is present on the second phase module branch 13, whereas the larger voltage ($U_{dc}-U_n$) is distributed on the first phase module branch 11 and the second phase module branch 404. Analogously to the processes in the first half of the cycle period of the AC voltage, a maximum voltage of ½ $U_{dc}$ again occurs on each phase module branch.

Figure 6:
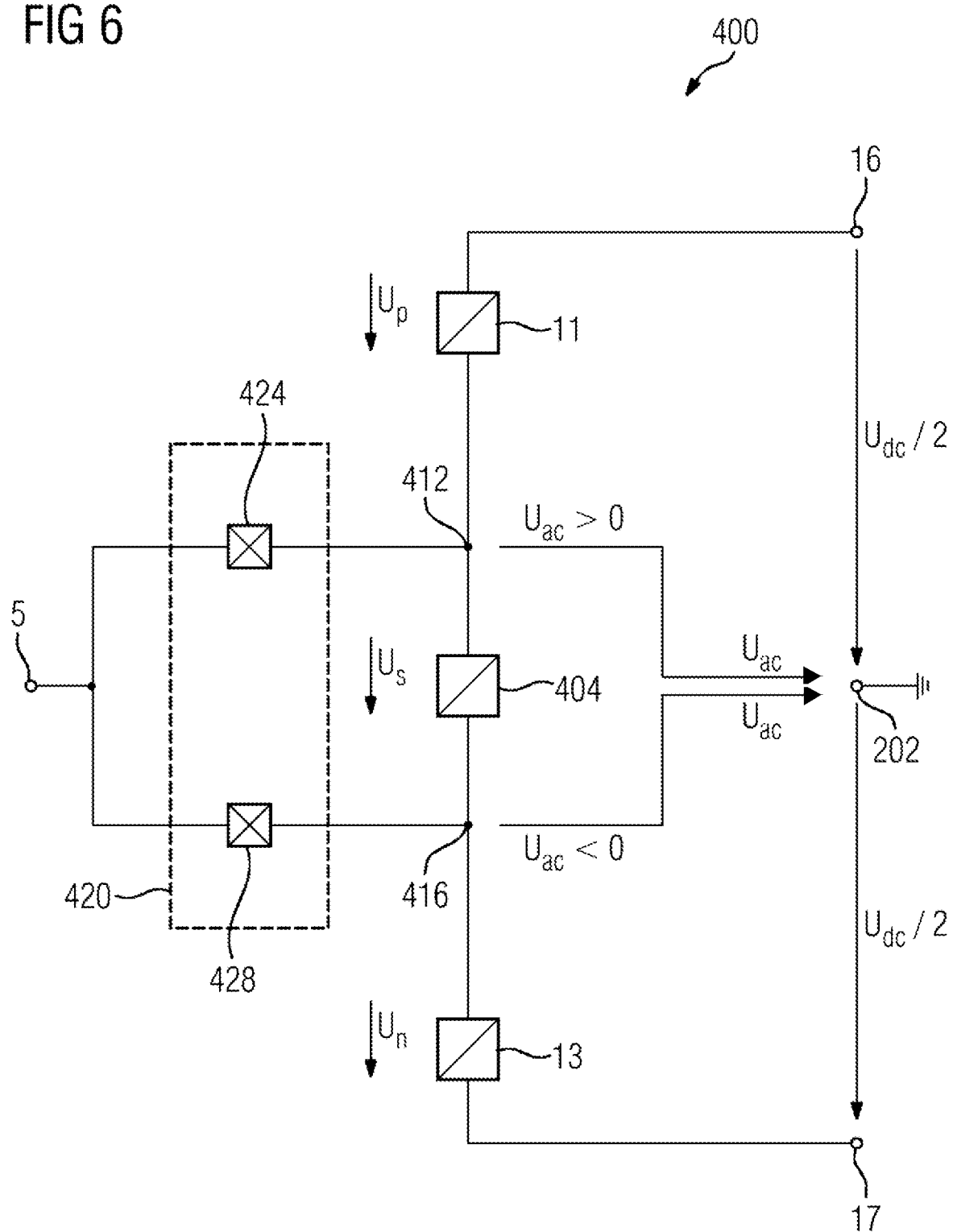
FIG. 6 shows an alternative representation of the phase module according to FIG. 4.

The phase module 400 according to FIG. 4 is again shown in FIG. 6, in a simplified representation. To this end, the first phase module branch 11, the second phase module branch 13 and the third phase module branch 404 are each symbolically represented as a square, marked with a diagonal line. The first power electronics switch 424 and the second power electronics switch 428 are each represented as a smaller square, marked with two diagonal lines. In FIG. 6, by means of voltage arrows, it is further represented how the AC voltage $U_{ac}$ present on the first AC voltage terminal 5 vis-à-vis the ground terminal 202 proceeds during the first half-cycle of the AC voltage ($U_{ac}>0$) between the first connection point 412 and the ground terminal 202. During the second half-cycle ($U_{ac}<0$), the AC voltage $U_{ac}$ is present between the second connection point 416 and the ground terminal 202 (this representation assumes that the first power electronics switch 424 and the second power electronics switch 428 behave as ideal switches, i.e. there is no voltage drop across these switches 424 and 428, in the switched-on state).

Figure 7:
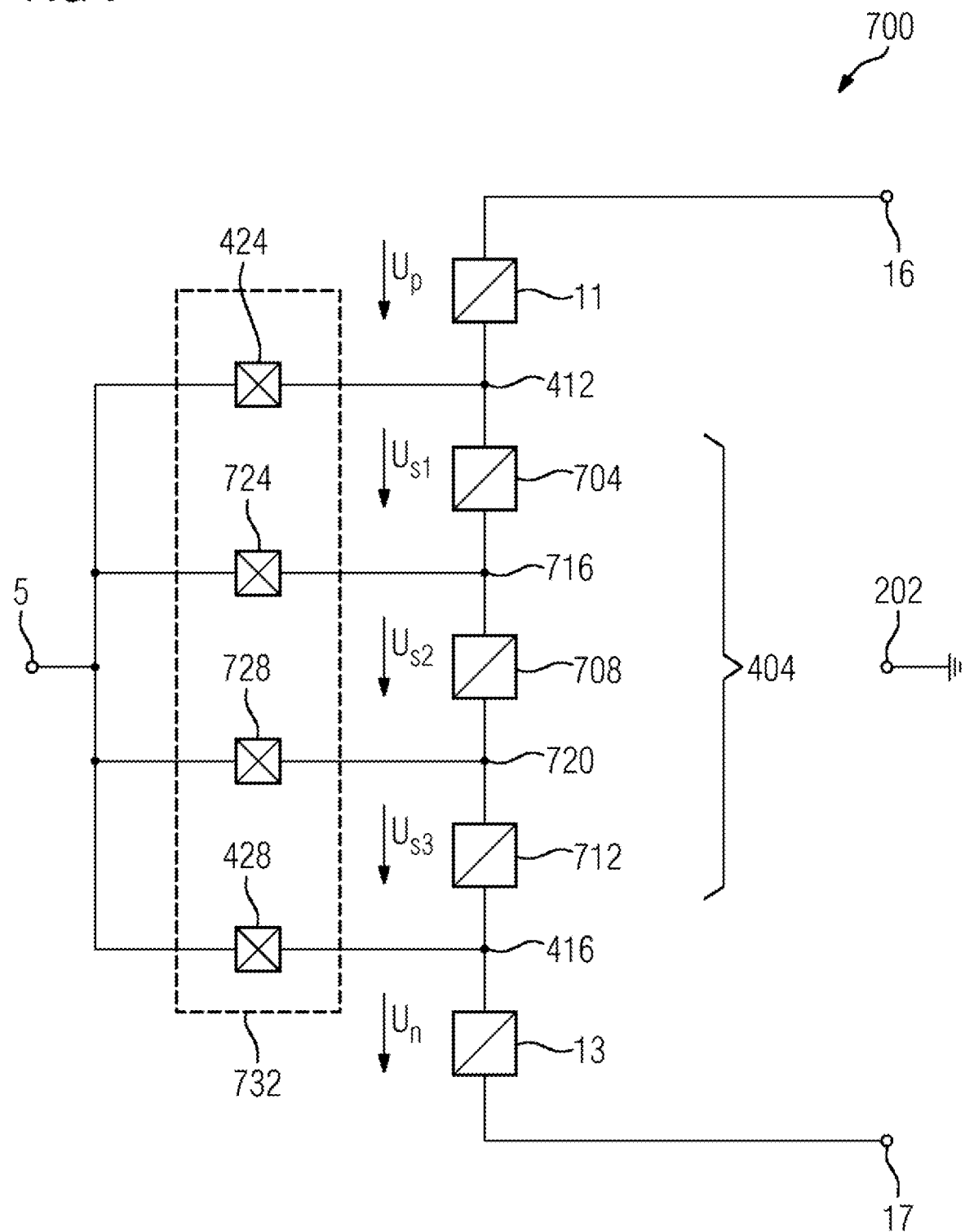
FIG. 7 represents a further exemplary embodiment of a phase module of a multilevel power converter.

FIG. 7 represents a further exemplary embodiment of a phase module 700. In this phase module 700, by way of distinction from the phase module according to FIG. 6, the third phase module branch is divided into three sub-branches: a first sub-branch 704, a second sub-branch 708 and a third sub-branch 712. The first phase module branch 11 is electrically connected to the first sub-branch 704, thereby constituting the first connection point 412. The first sub-branch 704 is electrically connected to the second sub-branch 708, thereby constituting a third connection point 716. The second sub-branch 708 is electrically connected to the third sub-branch 712, thereby constituting a fourth connection point 720, and the third sub-branch 712 is electrically connected to the second phase module branch 13, thereby constituting the second connection point 416.

A third power electronics switch 724 electrically connects the third connection point 716 to (or isolates the latter from) the AC voltage terminal 5. A fourth power electronics switch 728 electrically connects the fourth connection point 720 to (or isolates the latter from) the first AC voltage terminal 5. The switching device 732, in addition to the first switch position and the second switch position known from FIG. 6, further comprises a third switch position and a fourth switch position. In the third switch position, the first AC voltage terminal 5, by means of the third power electronics switch 724, is electrically connected to the third connection point 716 (and, by means of the remaining power electronics switches 424, 728 and 428, is electrically isolated from the connection points 412, 720 and 416). In the fourth switch position of the switching device 732, the first AC voltage terminal 5 is electrically connected to the fourth connection point 720 by means of the fourth power electronics switch 728 (and is electrically isolated from the connection points 412, 716 and 416 by means of the power electronics switches 424, 724 and 428). A voltage range of the AC voltage is thus assigned to each of the power electronics switches 424, 724, 728 and 428. These voltage ranges are non-overlapping voltage ranges. If the instantaneous value of the voltage which is present on the AC voltage terminal 5 lies within one of the voltage ranges, the associated power electronics switch closes, and connects the first AC voltage terminal 5 to the respective connection point. The AC voltage terminal 5 is then electrically isolated from the remaining connection points.

The first preselected voltage range can be, for example, the voltage range between +¼ $U_{dc}$ and +½ $U_{dc}$; the second preselected voltage range can be, for example, the voltage range between 0 and +¼ $U_{dc}$; the third preselected voltage range can be, for example, the voltage range between −¼ $U_{dc}$ and 0; the fourth preselected voltage range can be, for example, the voltage range between −½ $U_{dc}$ and −¼ $U_{dc}$.

The phase module 700 permits an even more flexible assignment of the modules of the individual sub-branches to the first phase module branch 11 or to the second phase module branch 13. Accordingly, these modules, by way of further differentiation, can be connected to the first phase module branch 11 or to the second phase module branch 13.

Figure 8:
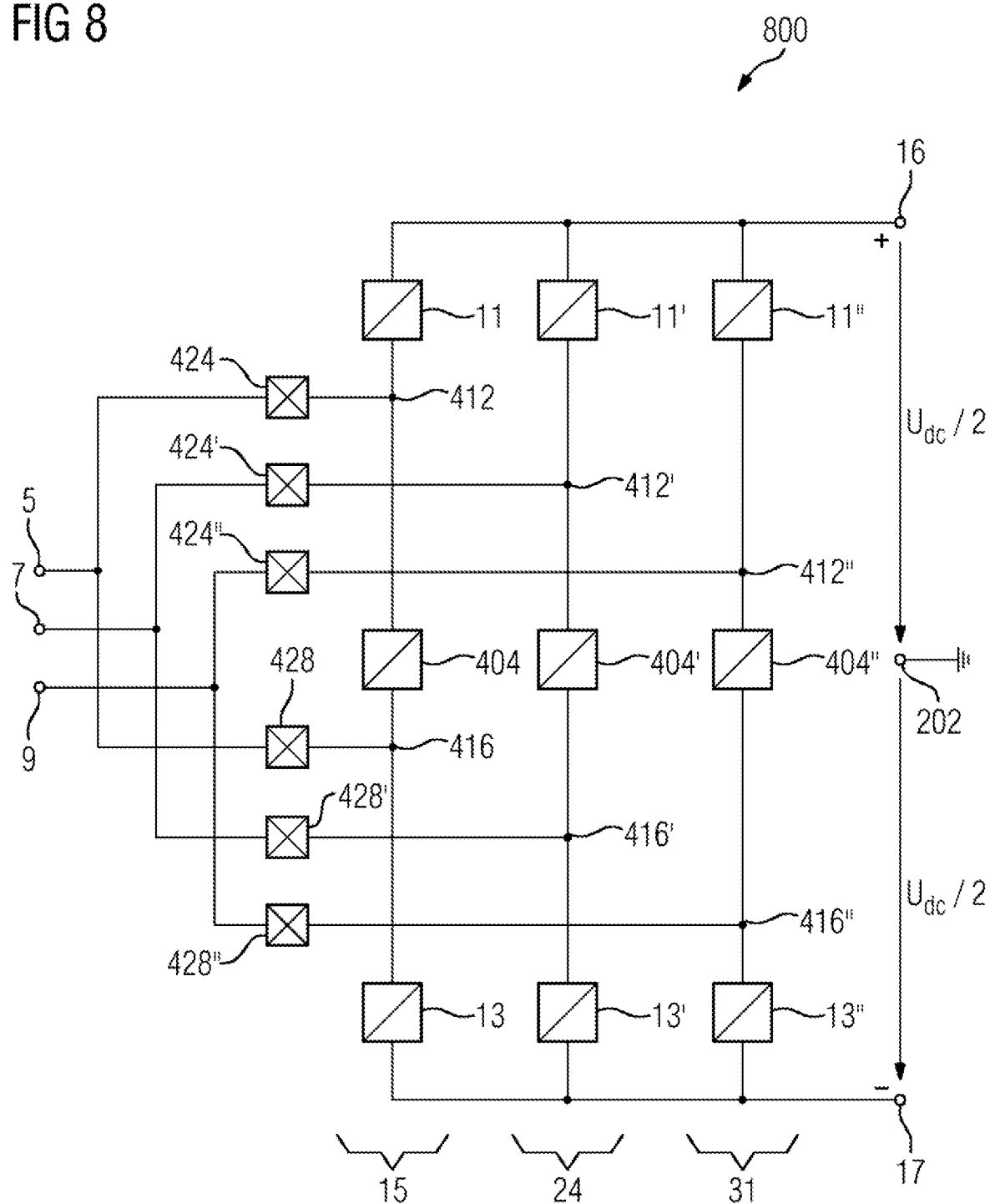
FIG. 8 represents an exemplary embodiment of a multilevel power converter having three phase modules.

FIG. 8 represents an exemplary embodiment of a multilevel power converter 800. This three-phase multilevel power converter 800 comprises three phase modules, in accordance with FIG. 6.

Figure 9:
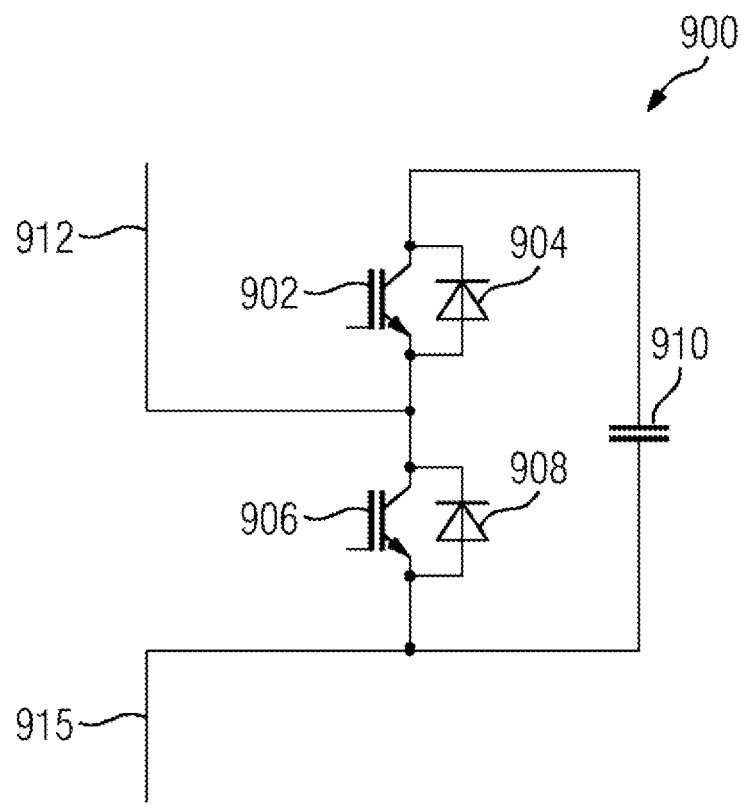
FIG. 9 represents an exemplary embodiment of a module of the multilevel power converter.

FIG. 9 represents an exemplary embodiment of a module 900 of the multilevel power converter. This can be, for example, one of the modules of the phase modules represented in FIG. 4 or 7.

The module 900 is configured as a half-bridge module 900. The module 900 comprises a first (interruptible) electronic switching element 902 (a first interruptible semiconductor valve 902) having a first antiparallel-connected diode 904. The module 900 further comprises a second (interruptible) electronic switching element 906 (a second interruptible semiconductor valve 906) having a second antiparallel-connected diode 908 and an electrical energy store 910 in the form of a capacitor 910. The first electronic switching element 902 and the second electronic switching element 906 are each configured as an IGBT (insulated-gate bipolar transistor). The first electronic switching element 902 is electrically connected in series with the second electronic switching element 906. At the connection point between the two electronic switching elements 902 and 906, a first galvanic module terminal 912 is arranged. On the terminal of the second electronic switching element 906 which is situated opposite the connection point, a second galvanic module terminal 915 is arranged. The second module terminal 915 is additionally electrically connected to a first terminal of the energy store 910; a second terminal of the energy store 910 is electrically connected to the terminal of the first electronic switching element 902 which is situated opposite the connection point.

The energy store 910 is thus electrically connected in parallel with the series-connected arrangement comprised of the first electronic switching element 902 and the second electronic switching element 906. By the corresponding actuation of the first electronic switching element 902 and the second electronic switching element 906 by means of an (unrepresented) electronic control apparatus of the power converter, it can be achieved that, between the first module terminal 912 and the second module terminal 915, either the voltage output from the energy store 910 is delivered, or no output voltage is delivered (i.e. a voltage output of zero). By the interaction of the modules on the individual phase module branches, the desired output voltage of the power converter can thus be generated in each case.

Figure 10:
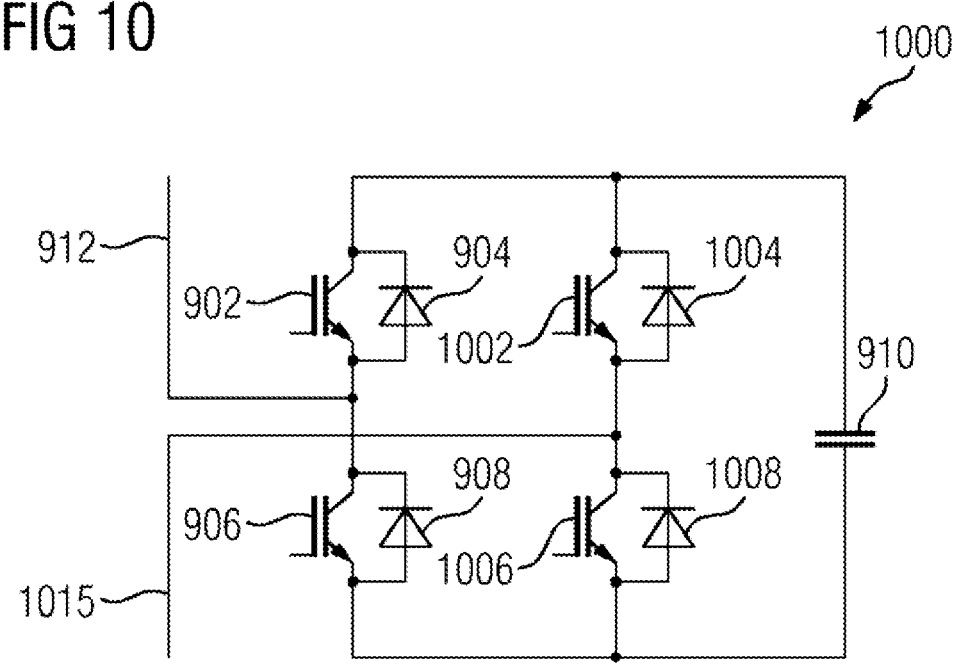
FIG. 10 represents a further exemplary embodiment of a module of the multilevel power converter.

FIG. 10 represents a further exemplary embodiment of a module 1000 of the multilevel power converter. This module 301 can be, for example, module 408_1 of the phase module 400 represented in FIG. 4 (or one of the other modules of the multilevel power converter). In addition to the first electronic switching element 902, the second electronic switching element 906, the first freewheeling diode 904, the second freewheeling diode 908 and the energy store 910 which are already known from FIG. 9, the module 1000 represented in FIG. 10 comprises a third electronic switching element 1002 having an antiparallel-connected third freewheeling diode 1004, and a fourth electronic switching element 1006 having an antiparallel-connected fourth freewheeling diode 1008. The third electronic switching element 1002 and the fourth electronic switching element 1006 are respectively configured as an IGBT. By way of distinction from the circuit represented in FIG. 9, the second module terminal 1015 is electrically connected, not to the second electronic switching element 906, but to a mid-point of an electrical series-connected arrangement comprised of the third electronic switching element 1002 and the fourth electronic switching element 1006.

The module 1000 according to FIG. 10 is a "full-bridge module" 1000. This full-bridge module 1000 is characterized in that, by the corresponding actuation of the four electronic switching elements, between the first (galvanic) module terminal 912 and the second (galvanic) module terminal 1015, optionally, either the positive voltage of the energy store 910, the negative voltage of the energy store 910, or a voltage with a value of zero (zero voltage) can be delivered as an output. Accordingly, by means of the full-bridge module 1000, the polarity of the output voltage can be reversed. The multilevel power converter can comprise only half-bridge modules 900, only full-bridge modules 1000, or both half-bridge modules 900 and full-bridge modules 1000.

Figure 11:
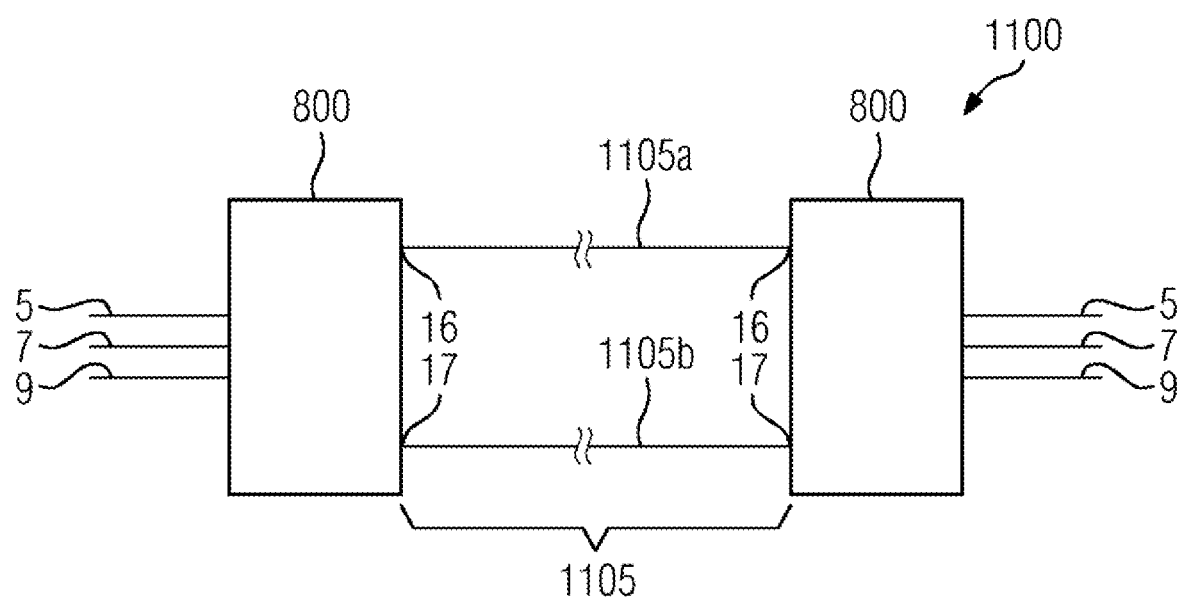
FIG. 11 represents an exemplary embodiment of a high-voltage direct current transmission installation.

FIG. 11 shows a schematic representation of a high-voltage direct current transmission installation 1100. This high-voltage direct current transmission installation 1100 comprises two power converters 800, of the type represented in FIG. 8. These two power converters 800 are electrically interconnected on the DC voltage-side by means of a high-voltage direct current link 1105. Both positive DC voltage terminals 16 of the power converters 800 are thus electrically interconnected by means of a first high-voltage direct current line 1105a; both negative DC voltage terminals 17 of the two power converters 800 are electrically interconnected by means of a second high-voltage direct current line 1105b. By means of a high-voltage direct current transmission installation 1100 of this type, electrical energy can be transmitted over long distances; the high-voltage direct current link 1105 is then of a corresponding length. In FIG. 11, by way of an example, a high-voltage direct current transmission installation 1100 in a symmetrical monopole configuration is represented. Naturally, however, the power converter can also be employed in other high-voltage direct current transmission installations, for example in bipole installations.

For the operation of a multilevel power converter according to FIG. 8, the instantaneous value of the voltage which is present on the AC voltage terminal 5 of the multilevel power converter is thus measured. Depending upon the measured instantaneous value, the AC voltage terminal 5 is then electrically connected to the first connection point 412 or the second connection point 416 (or optionally to one of the further connection points, such as e.g. to the third connection point 716 or the fourth connection point 720). In each case, the AC voltage terminal 5 is thus electrically connected to only one of the connection points; the AC voltage terminal 5 is electrically isolated from the other connection points by means of the other power electronics conductors.

In the event of a multilevel power converter having phase modules according to FIG. 6, the AC voltage terminal 5 is then electrically connected to the first connection point 412 if the instantaneous value of the voltage which is present on the AC voltage terminal 5 is greater than (or equal to) zero. The AC voltage terminal 5 is then electrically connected to the second connection point 416, if the instantaneous value of the voltage which is present on the AC voltage terminal is lower than zero.

In the event of a multilevel power converter having phase modules according to FIG. 7 (i.e. phase modules, wherein the third phase module branch comprises a plurality of sub-branches), the AC voltage terminal 5 is electrically connected in each case, by means of the switching device 732, to the connection point within the associated preselected voltage range of which the instantaneous value of the alternating voltage $U_{ac}$ (which is present on the AC voltage terminal) lies. The AC voltage terminal 5 is electrically isolated from the remaining connection points.

The switching device 420, 732, in the event of the occurrence of faults, can also be employed for fault detection in a particularly advantageous manner. If, for example, in a multilevel power converter having phase modules 400 according to FIG. 4, a short-circuit occurs on the DC voltage side, the switching device 420 can then assume a specific position (which will be described here as the fault position), in which the switching device electrically isolates the first AC voltage terminal 5 from all the connection points 412, 416 of the phase module. As a result, the energy flux from the AC voltage grid system which is connected to the AC voltage terminal of the power converter is interrupted at the location of the DC voltage-side fault. This electrical interruption/isolation can be executed very rapidly. Specifically, if the switching device is equipped with thyristors, the transition to the fault position can be executed simply, wherein the actuation signals for the thyristors are deactivated, such that the thyristors, at the next zero-crossing of the AC voltage, assume a blocking state. The alternating current can be very rapidly disconnected as a result.

A multilevel power converter and a method for operating said multilevel power converter have been described wherein, in comparison with a conventional multilevel power converter, a lower number of modules is sufficient. As a result, both costs and structural space can be economized, and power losses occurring in the switching elements of the modules can be reduced.

An option for the combination of a multilevel power converter with thyristor valves/thyristor switches has been described. This novel power converter topology permits a reduction in the number of series-connected modules in the phase modules. Antiparallel thyristor valves are employed, in order to reduce the maximum voltage occurring on each of the individual phase module branches. For example, by the employment of a third phase module branch, it is possible to reduce the voltage from 200% $U_{dc}$ to 150% $U_{do}$.

In the novel phase module, in comparison with the known embodiment of phase modules (which comprise only a first positive-side phase module branch and a second negative-side phase module branch), the phase module is subdivided into three phase module branches: a first phase module branch constitutes a positive-side phase module branch, a second phase module branch constitutes a negative-side phase module branch, and a third phase module branch constitutes a central phase module branch. The antiparallel thyristor valves permit the voltage of 100% $U_{dc}$ delivered by one phase module branch to be limited to 50% $U_{dc}$. The requisite power converter capacity is thus reduced from two times 100% to three times 50%. This corresponds to an economization of 25% of the requisite capacity. This can result in an economization of 25% in the requisite modules.

A further advantage is provided in that, by means of the thyristor valves/thyristor switches, faults can be detected more rapidly, in comparison with fault detection by means of a power switch which is arranged on the AC voltage-side of the multilevel power converter. As a result, the loading of the multilevel power converter in the event of a fault can be reduced.

Once a protective command has been tripped by way of fault detection, the trigger pulse of the thyristors is deactivated. Thereafter, the thyristors assume a blocking state, such that the AC current flowing rapidly moves towards zero. This occurs within a few milliseconds. Conversely, a conventional AC-side power switch requires switching times of approximately 2.5 to 3 cycle periods, or between approximately 50 ms and 60 ms at an AC frequency of 50 Hz. By means of the switching apparatus described, faults can thus be detected significantly more rapidly than by means of a conventional AC-side power switch.

Moreover, in comparison with modules having IGBT switching elements, the thyristors feature substantially lower forward power losses (a lower loss per component), higher blocking voltages (thus requiring a lower number of series-connected components for the achievement of the same voltage) and consequently lower costs. The increased expenditure associated with additional thyristor valves is thus more than offset by the economization of modules.

The above-mentioned multilevel power converter and the above-mentioned method can be employed in installations of a wide variety of types, for example in high-voltage direct current transmission systems using underground cables or overhead lines.

The invention claimed is:

1. A multilevel power converter, comprising:
    a first DC voltage terminal, a second DC voltage terminal, an AC voltage terminal, and at least one phase module connected between said first and second DC voltage terminals;
    said at least one phase module including a plurality of modules, each of said plurality of modules including at least two electronic switching elements and an electrical energy storage device;
    said at least one phase module including a first phase module branch connected to said first DC voltage terminal, a second phase module branch connected to said second DC voltage terminal, and a third phase module branch connecting said first phase module branch to said second phase module branch;

a switching device configured, in a first switch position, to connect said AC voltage terminal to a first connection point between said first phase module branch and said third phase module branch and, in a second switch position, to connect said AC voltage terminal to a second connection point between said third phase module branch and said second phase module branch;

said switching device including a first power electronics switch having antiparallel-connected thyristors; and said switching device including a second power electronics switch having antiparallel-connected thyristors.

2. The multilevel power converter according to claim 1, wherein said switching device, in the second switch position, isolates said AC voltage terminal of the multilevel power converter from said first connection point and, in the first switch position, isolates said AC voltage terminal from said second connection point.

3. The multilevel power converter according to claim 1, wherein each of said first phase module branch, said second phase module branch, and said third phase module branch respectively comprises at least two of said plurality of modules in a series-connected circuit.

4. The multilevel power converter according to claim 1, wherein each of said first, second, and third phase module branches comprises at least five of said plurality of modules connected in series.

5. The multilevel power converter according to claim 1, wherein:
said switching device comprises a first power electronics switch which, in the first switch position of said switching device, connects said AC voltage terminal to said first connection point and, in the second switch position of said switching device, isolates said AC voltage terminal from said first connection point; and
said switching device comprises a second power electronics switch which, in the second switch position of said switching device, connects said AC voltage terminal to said second connection point and, in the first switch position of said switching device, isolates said AC voltage terminal from said second connection point.

6. The multilevel power converter according to claim 1, wherein at least one module of said third phase module branch is configured to deliver a voltage output with a positive or a negative polarity.

7. The multilevel power converter according to claim 1, wherein at least one module of said third phase module branch comprises a full-bridge circuit.

8. The multilevel power converter according to claim 7, wherein said full-bridge circuit comprises four electronic switching elements and an electrical energy storage device.

9. The multilevel power converter according to claim 1, wherein said third phase module branch comprises a plurality of electrically series-connected sub-branches, and said switching device has a third switch position, wherein said AC voltage terminal is connected to a third connection point of two said sub-branches.

10. The multilevel power converter according to claim 1, wherein said switching device is configured to assume the switch positions in accordance with an instantaneous value of a voltage that is present at said AC voltage terminal.

11. The multilevel power converter according to claim 10, wherein:

said switching device assumes the first switch position when the instantaneous value of the voltage at said AC voltage terminal is greater than zero, and said switching device assumes the second switch position when the instantaneous value of the voltage at said AC voltage terminal is lower than zero, or said switching device assumes the first switch position when the instantaneous value of the voltage at said AC voltage terminal lies within a first preselected voltage range, and said switching device assumes the second switch position when the instantaneous value of the voltage at said AC voltage terminal lies within a second preselected voltage range.

12. A high-voltage direct current transmission installation, comprising a multilevel power converter according to claim 1.

13. A method of operating the multilevel power converter according to claim 1, the method comprising:
measuring an instantaneous value of a voltage that is present on the AC voltage terminal of the multilevel power converter; and
depending on the measured instantaneous value, connecting the AC voltage terminal to the first connection point between the first phase module branch and the third phase module branch, or connecting the AC voltage terminal to the second connection point between the third phase module branch and the second phase module branch.

14. The method according to claim 13, which comprises:
placing the switching device into the first switch position to connect the AC voltage terminal to the first connection point and to isolate the AC voltage terminal from the second connection point; or
placing the switching device into the second switch position to connect the AC voltage terminal to the second connection point and to isolate the AC voltage terminal from the first connection point.

15. The method according to claim 13, which comprises:
connecting the AC voltage terminal to the first connection point when the instantaneous value of the voltage at the AC voltage terminal is greater than zero, and connecting the AC voltage terminal to the second connection point when the instantaneous value of the voltage at the AC voltage terminal is lower than zero; or
connecting the AC voltage terminal to the first connection point when the instantaneous value of the voltage at the AC voltage terminal lies within a first preselected voltage range, and connecting the AC voltage terminal to the second connection point when the instantaneous value of the voltage at the AC voltage terminal lies within a second preselected voltage range.

16. The method according to claim 13, wherein the third phase module branch comprises a plurality of electrically series-connected sub-branches, between which at least one further connection point is provided, and the method further comprises connecting the AC voltage terminal to the first connection point, to the second connection point, or to the further connection point in dependence on the measured instantaneous value.

17. The method according to claim 13, which comprises, in the event of an occurrence of a fault, isolating the AC voltage terminal from the phase module by way of the switching device.

* * * * *